United States Patent
Xie et al.

(10) Patent No.: US 12,432,529 B2
(45) Date of Patent: Sep. 30, 2025

(54) MULTICAST SERVICE PROCESSING METHOD, MULTICAST SERVICE CONFIGURATION METHOD, AND COMMUNICATIONS DEVICE

(71) Applicant: VIVO MOBILE COMMUNICATION CO., LTD., Guangdong (CN)

(72) Inventors: Zhenhua Xie, Guangdong (CN); Yanxia Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 441 days.

(21) Appl. No.: 17/847,295

(22) Filed: Jun. 23, 2022

(65) Prior Publication Data
US 2022/0322051 A1 Oct. 6, 2022

Related U.S. Application Data

(63) Continuation of application No. PCT/CN2020/142088, filed on Dec. 31, 2020.

(30) Foreign Application Priority Data

Jan. 2, 2020 (CN) .......................... 202010002037.3
Jan. 17, 2020 (CN) .......................... 202010052208.3

(51) Int. Cl.
*H04W 4/06* (2009.01)
*H04W 4/021* (2018.01)
*H04W 4/029* (2018.01)

(52) U.S. Cl.
CPC ............. *H04W 4/06* (2013.01); *H04W 4/021* (2013.01); *H04W 4/029* (2018.02)

(58) Field of Classification Search
CPC ....... H04W 4/06; H04W 4/021; H04W 4/029; H04W 4/40; H04W 8/02; H04W 24/02
See application file for complete search history.

(56) References Cited

U.S. PATENT DOCUMENTS

| 5,887,252 A * | 3/1999 | Noneman ............. H04W 76/10 |
| | | 370/335 |
| 9,125,174 B2 * | 9/2015 | Wu ........................ H04W 72/30 |

(Continued)

FOREIGN PATENT DOCUMENTS

| CN | 102291678 A | 12/2011 |
| CN | 102387472 A | 3/2012 |

(Continued)

OTHER PUBLICATIONS

Alcatel-Lucent, Alcatel-Lucent Shanghai Bell, Scenarios and location based service provisioning, Discussion, 3GPP TSG-RAN WG2 Meeting #75, R2-114278, Aug. 22-26, 2011, Athens, Greece.

(Continued)

*Primary Examiner* — Rasheed Gidado
(74) *Attorney, Agent, or Firm* — Price Heneveld LLP

(57) ABSTRACT

The present invention provides a multicast service processing method, a multicast service configuration method, and a communications device. The multicast service processing method includes: receiving a multicast area configuration sent by a network device, where the multicast area configuration includes area parameter information of a multicast service; obtaining wireless area information in a case that the multicast area configuration sent by the network device has been received; and determining, based on the area parameter information and the wireless area information, whether the terminal is located in a service area of the multicast service.

18 Claims, 5 Drawing Sheets

---

201 — Receive a multicast area configuration sent by a network device

202 — Obtain wireless area information in a case that the multicast area configuration has been received 203 — Determine, based on the area parameter information and the wireless area information, whether the terminal is located in a service area of the multicast service

(56) References Cited

U.S. PATENT DOCUMENTS

| | | | |
|---|---|---|---|
| 2005/0090278 A1* | 4/2005 | Jeong | H04W 36/0055 455/525 |
| 2007/0275742 A1* | 11/2007 | Zhang | H04W 4/06 455/466 |
| 2010/0315987 A1* | 12/2010 | Kuo | H04W 72/30 370/312 |
| 2012/0314642 A1 | 12/2012 | Xu | |
| 2013/0016645 A1 | 1/2013 | Moriwaki et al. | |
| 2013/0258934 A1 | 10/2013 | Amerga et al. | |
| 2014/0233452 A1 | 8/2014 | Kim et al. | |
| 2014/0301210 A1* | 10/2014 | Kim | H04W 24/08 370/241 |
| 2014/0313974 A1* | 10/2014 | Chandramouli | H04W 4/06 370/328 |
| 2018/0192255 A1 | 7/2018 | Guo et al. | |
| 2020/0178042 A1 | 6/2020 | Zhu et al. | |
| 2020/0267513 A1 | 8/2020 | Zhu et al. | |
| 2021/0168786 A1 | 6/2021 | Takano | |

FOREIGN PATENT DOCUMENTS

| | | |
|---|---|---|
| CN | 103975543 A | 8/2014 |
| CN | 109391909 A | 2/2019 |
| CN | 109769150 A | 5/2019 |
| CN | 110557724 A | 12/2019 |
| CN | 112073919 A | 12/2020 |
| WO | 2011079738 A1 | 7/2011 |
| WO | 2011083704 A1 | 7/2011 |
| WO | 2012137075 A2 | 10/2012 |
| WO | 2019116773 A1 | 6/2019 |

OTHER PUBLICATIONS

VIVO, "Solution for local MBS multicast service discovery", WG2 Meeting #136AH, S2-2001431, Jan. 13-17, 2020, Seoul, Korea.
VIVO, "Solution for local MBS multicast service discovery", SA WG2 Meeting #136AH, S2-2000148, Jan. 13-17, 2020, Seoul, Korea.

* cited by examiner

MULTICAST SERVICE PROCESSING METHOD, MULTICAST SERVICE CONFIGURATION METHOD, AND COMMUNICATIONS DEVICE

CROSS-REFERENCE TO RELATED APPLICATIONS

The present application is a bypass continuation application of International Application No. PCT/CN2020/142088 filed on Dec. 31, 2020, which claims priority to Chinese Patent Application No. 202010002037.3 filed in China on Jan. 2, 2020, and Chinese Patent Application No. 202010052208.3 filed in China on Jan. 17, 2020, which are incorporated herein by reference in their entireties.

TECHNICAL FIELD

The present invention relates to the field of communications technologies, and in particular, to a multicast service processing method, a multicast service configuration method, and a communications device.

BACKGROUND

In a communications system, transmitted services include a unicast service and a multicast service. The 3rd generation partnership project (3GPP) has defined a multicast service user join procedure in a mobile network, so that a network device can directly send a multicast service by multicast or broadcast. As for a new radio (NR) system, how to apply a multicast service to the NR system has not been discussed yet. If the multicast service is applied to the NR system, how to discover the multicast service becomes an urgent problem to be resolved.

SUMMARY

Embodiments of the present invention provide a multicast service processing method, a multicast service configuration method, and a communications device.

According to a first aspect, an embodiment of the present invention provides a multicast service processing method, applied to a terminal and including:
    receiving a multicast area configuration sent by a network device, where the multicast area configuration includes area parameter information of a multicast service;
    obtaining wireless area information in a case that the multicast area configuration sent by the network device has been received; and
    determining, based on the area parameter information and the wireless area information, whether the terminal is located in a service area of the multicast service.

According to a second aspect, an embodiment of the present invention provides a multicast service configuration method, applied to a network device and including:
    sending a multicast area configuration to a terminal, where the multicast area configuration includes area parameter information of a multicast service, and the area parameter information is used to trigger the terminal to obtain wireless area information and determine, based on the area parameter information and the wireless area information, whether the terminal is located in a service area of the multicast service.

According to a third aspect, an embodiment of the present invention provides a terminal, including:
    a receiving module, configured to receive a multicast area configuration sent by a network device, where the multicast area configuration includes area parameter information of a multicast service;
    an obtaining module, configured to obtain wireless area information in a case that the multicast area configuration sent by the network device has been received; and
    a determining module, configured to determine, based on the area parameter information and the wireless area information, whether the terminal is located in a service area of the multicast service.

According to a fourth aspect, an embodiment of the present invention provides a network device, including:
    a sending module, configured to send a multicast area configuration to a terminal, where the multicast area configuration includes area parameter information of a multicast service, and the area parameter information is used to trigger the terminal to obtain wireless area information and determine, based on the area parameter information and the wireless area information, whether the terminal is located in a service area of the multicast service.

According to a fifth aspect, an embodiment of the present invention provides a terminal, including a memory, a processor, and a program stored in the memory and capable of running on the processor, where when the program is executed by the processor, the steps of the foregoing multicast service processing method are implemented.

According to a sixth aspect, an embodiment of the present invention provides a network device, including a memory, a processor, and a program stored in the memory and capable of running on the processor, where when the program is executed by the processor, the steps of the foregoing multicast service configuration method are implemented.

According to a seventh aspect, an embodiment of the present invention provides a computer-readable storage medium, where the computer-readable storage medium stores a computer program, and when the computer program is executed by a processor, the steps of the foregoing multicast service processing method are implemented; or when the computer program is executed by a processor, the steps of the foregoing multicast service configuration method are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants thereof are intended to cover a non-exclusive inclusion. For example, a process, method, system, product, or device that includes a list of steps or units is not necessarily limited to those expressly listed steps or units, but may include other steps or units not expressly listed or inherent to such a process, method, product, or device. In addition, in the specification and claims, the use of "and/or" represents presence of at least one of the connected objects, for example, "A and/or B" indicates the following three cases: only A presents, only B presents, or both A and B present.

In the embodiments of the present invention, the word such as "an example" or "for example" is used to represent giving an example, an instance, or an illustration. Any embodiment or design solution described as "an example" or "for example" in the embodiments of the present invention shall not be construed as being more preferential or advantageous than other embodiments or design solutions. To be precise, the word such as "an example" or "for example" is intended to present a related concept in a specific manner.

The following describes the embodiments of the present invention with reference to the accompanying drawings. A multicast service processing method, a multicast service configuration method, and a communications device provided in the embodiments of the present invention may be applied to a wireless communications system. The wireless communications system may be a 5G system, an evolved long term evolution (eLTE) system, or a later evolved communications system.

Figure 1:
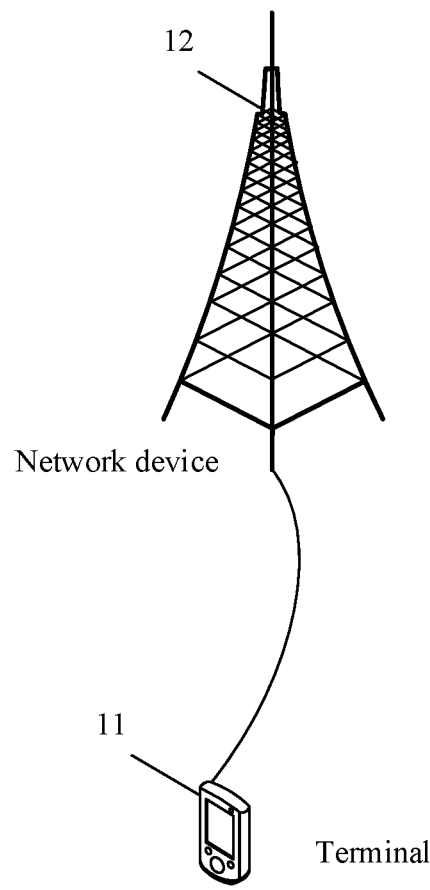
FIG. 1 is a structural diagram of a network system to which an embodiment of the present invention may be applied.

Referring to FIG. 1, FIG. 1 is a structural diagram of a network system to which an embodiment of the present invention may be applied. As shown in FIG. 1, the network system includes a terminal 11 and a network device 12. The terminal 11 may be a user terminal or other terminal-side devices such as a mobile phone, a tablet personal computer, a laptop computer, a personal digital assistant (PDA), a mobile Internet device (MID), or a wearable device. It should be noted that a specific type of the terminal 11 is not limited in the embodiments of the present invention. The network device 12 may be a 5G base station, or a base station of a later version, or a base station in another communications system, or is referred to as a NodeB, or an evolved NodeB, or a transmission and reception point (TRP), or an access point (AP), or another term in the art, as long as a same technical effect is achieved. The network device is not limited to a specific technical term. In addition, the network device 12 may be a master node (MN) or a secondary node (SN). It should be noted that, in the embodiments of the present invention, the 5G base station is used as only an example, but a specific type of the network device is not limited.

Figure 2:
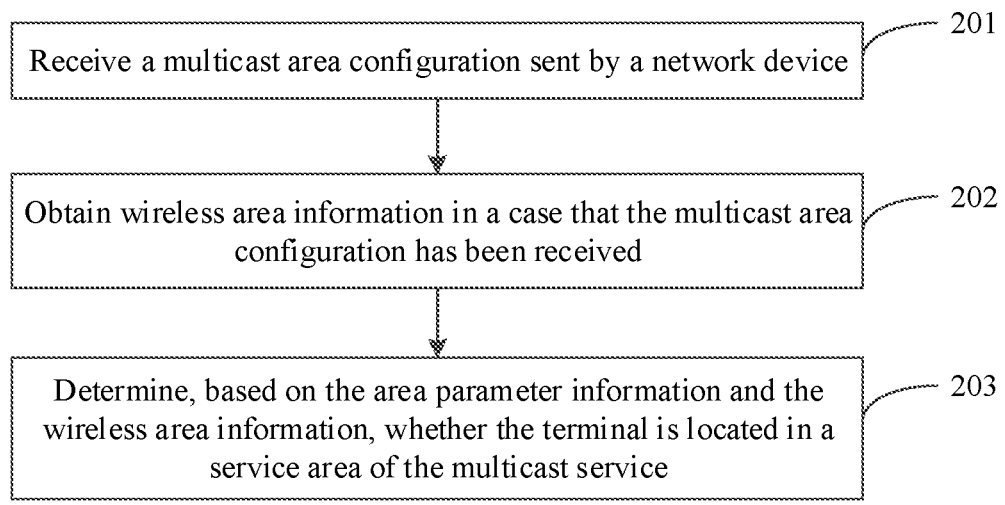
FIG. 2 is a flowchart of a multicast service processing method according to an embodiment of the present invention.

Referring to FIG. 2, FIG. 2 is a flowchart of a multicast service processing method according to an embodiment of the present invention. The method is applied to a terminal. As shown in FIG. 2, the method includes the following steps.

Step 201: Receive a multicast area configuration sent by a network device, where the multicast area configuration includes area parameter information of a multicast service.

Optionally, the area parameter information may include one or more parameters. For example, in an embodiment, the area parameter information includes at least one of geographic location information, tracking area information, cell identification information, and frequency information. It should be understood that the area parameter information may include an area parameter provided by a multicast service provider and/or an area parameter obtained through mapping by a core network element. The tracking area information is obtained through mapping by a first network entity (for example, a core network element) based on the geographic location information.

The geographic location information is used to indicate a geographic area corresponding to a service area of the multicast service. Optionally, the geographic location information may indicate a range of a geographic area or may indicate a central location of a geographic area. The service area of the multicast service may include one or more service areas.

The tracking area information is used to indicate a tracking area corresponding to the service area of the multicast service. In this embodiment, the service area of the multicast service may correspond to one or more tracking areas. In other words, the service area of the multicast service may include M tracking areas, and the M tracking areas may belong to N cells, where N and M are positive integers, and N is less than or equal to M. For example, the UE may determine whether a serving cell of the UE belongs to a specific tracking area of a multicast service by detecting wireless information of the serving cell of the UE (for example, tracking area identification information provided in a system message of the cell), and then determine whether the UE is in a service area of the multicast service.

The cell identification information is used to indicate a cell corresponding to the service area of the multicast service. In this embodiment, the multicast service may be transmitted in a multicast mode in one or more cells, and the cell identification information may indicate cells in which the multicast service can be transmitted in the multicast mode. For example, the UE may determine whether a serving cell belongs to a specific cell of a multicast service by detecting wireless information of the serving cell of the UE (for example, cell identification information provided in a system message of the cell), and then determine whether the UE is in a service area of the multicast service.

The frequency information is used to indicate a frequency corresponding to the service area of the multicast service. In this embodiment, the multicast service may be transmitted in a multicast mode on one or more frequencies, and the frequency information may indicate a frequency corresponding to the multicast service transmitted in the multicast mode. For example, the UE may determine whether a serving cell belongs to a specific frequency of a multicast service by detecting wireless information of the serving cell of the UE (for example, frequency information corresponding to the cell), and then determine whether the UE is in a service area of the multicast service.

Step 202: Obtain wireless area information in a case that the multicast area configuration has been received.

In this embodiment of the present invention, the terminal may obtain the wireless area information when receiving the multicast area configuration. Optionally, the terminal may obtain wireless area information based on a system message of a cell, where the wireless area information may indicate information about the cell, a tracking area to which the cell belongs, a frequency of the cell, and the like.

Step 203: Determine, based on the area parameter information and the wireless area information, whether the terminal is located in a service area of the multicast service.

In this embodiment of the present invention, whether the terminal is located in the service area of the multicast service may be determined based on the area parameter information; or whether the terminal is located in the service area of the multicast service may be determined based on the area parameter information and the wireless area information. For example, in a case that the area parameter information includes only the geographic location information, whether the terminal is located in the service area of the multicast service may be determined based on the area parameter information. In a case that the area parameter information includes at least one of tracking area information, cell identification information, and frequency information, whether the terminal is located in the service area of the multicast service may be determined based on the area parameter information and the wireless area information.

In this embodiment of the present invention, the multicast area configuration sent by the network device carries the area parameter information to trigger the terminal to obtain the wireless area information, and whether the terminal is located in the service area of the multicast service is determined based on the area parameter information and the wireless area information. In a case that it is determined that the terminal is located in the service area of the multicast service, it can be determined that the multicast service is a multicast service that may be received by the terminal in the multicast mode. In this way, the embodiments of the present invention implement a function of discovering a multicast service in an NR system.

Optionally, in an embodiment, the method further includes:

in a case that it is determined that the terminal is located in the service area of the multicast service, initiating a multicast session establishment procedure for the multicast service.

In this embodiment of the present invention, when the terminal is interested in the multicast service, the terminal may initiate a multicast session establishment procedure to receive the multicast service in the multicast mode. If the network device has not established a multicast mode data channel, the network device establishes a multicast mode data channel. If the network device has established a multicast mode data channel, the network device may notify the terminal to receive the multicast service in the multicast mode or send necessary information (such as security information) for receiving the multicast service to the terminal.

Optionally, in a case that it is determined that the terminal is located in the service area of the multicast service, detection of a multicast service identifier is started. Whether multicast service data can be detected may be determined through the detection of the multicast service identifier. For example, the multicast service identifier may be a temporary mobile group identity (TMGI).

Optionally, if the terminal is not located in the service area of the multicast service, the detection of the multicast service identifier is stopped. For example, in an implementation, in a case that the terminal starts detection of a multicast service identifier, if the terminal moves from the service area of the multicast service to outside of the service area of the multicast service, the terminal stops the started detection of the multicast service identifier. Alternatively, in another implementation, in a case that it is determined, based on the area parameter information and the wireless area information, that the terminal is not located in the service area of the multicast service, the detection of the multicast service identifier is not started. The detection of the multicast service identifier is stopped or the detection of the multicast service identifier is not started, which can reduce power consumption of the terminal.

Further, to reduce signaling overheads, the terminal needs to satisfy a first condition before initiating the multicast session establishment procedure. For example, in this embodiment, the method further includes:

in a case that a first condition is satisfied, initiating a multicast session establishment procedure for the multicast service; where the first condition includes:

it is determined that the terminal is located in the service area of the multicast service; and no service data of the multicast service is detected or there is no key information for receiving the multicast service.

In this embodiment, the terminal is in the service area of the multicast service. If the terminal detects no multicast service data or the terminal has no necessary information (such as security information) for receiving the multicast service, the terminal initiates a multicast session establishment procedure to request to join a multicast session. For example, the terminal is in the service area of the multicast service, and the network device indicates a multicast service receiving method (for example, a cell providing the multicast service indicates a time-frequency resource location of the multicast service data through a system message). If the terminal detects no multicast data by using the multicast service receiving method provided by the network device, the terminal initiates a multicast session establishment procedure. Alternatively, if the terminal detects multicast data by using the multicast service receiving method provided by the network device, but cannot parse the data (for example, the multicast data received by the terminal has been treated securely, but the terminal cannot successfully parse the data without relevant security parameters), the terminal initiates a multicast session establishment procedure.

Optionally, in an embodiment, in a case that a second condition is satisfied, it is determined that the terminal is located in the service area of the multicast service; where
the second condition includes at least one of the following:

condition 1: the terminal is located in a geographic area corresponding to the geographic location information;

condition 2: a tracking area corresponding to the wireless area information is included in a tracking area corresponding to the tracking area information;

condition 3: a cell corresponding to the wireless area information is included in a cell corresponding to the cell identification information; and condition 4: a frequency corresponding to the wireless area information is included in a frequency corresponding to the frequency information.

It should be noted that the second condition may include one or more of the foregoing conditions. The following provides details by using an example in which whether the terminal is located in the service area of the multicast service is determined based on the geographic location information and/or tracking area information.

For example, in an embodiment, whether the terminal is located in the service area of the multicast service is determined based on the geographic location information, and in this case, the second condition includes condition 1. In this embodiment, the area parameter information includes the geographic location information. The geographic location information indicates that the multicast service is sent in the multicast mode in geographic area A, and the terminal determines whether the terminal is in geographic area A based on positioning information. If the terminal is in geographic area A, it is considered that the terminal is located in the service area of the multicast service.

In another embodiment, whether the terminal is located in the service area of the multicast service is determined based on the tracking area information, and in this case, the second condition includes condition 2. In this embodiment, the area parameter information includes the tracking area information. Optionally, the tracking area information may be indicated by using a tracking area code (TAC). For example, if the area parameter information received by the UE indicates that multicast service 1 is provided in an area in which a tracking area is TAC 1, the terminal detects a system message of a cell nearby the terminal. If a system message of a cell indicates that a tracking area to which the cell belongs is TAC 1, it is determined that a terminal accessing the cell is in a service area of multicast service 1. If a system message of a specific cell indicates that a tracking area to which the cell belongs is TAC 2, it is determined that a terminal accessing the cell determines that the terminal is not in the service area of multicast service 1.

In still another embodiment, whether the terminal is located in the service area of the multicast service is determined based on the geographic location information and the tracking area information, and in this case, the second condition includes condition 1 and condition 2. In this embodiment, the area parameter information includes the geographic location information and the tracking area information. In this case, the terminal can preliminarily determine whether the terminal is in a service area of a specific multicast service based on positioning information and the geographic location information. If the terminal preliminarily determines that the terminal is in the service area of the multicast service, the terminal can further determine whether the terminal is in the service area of the multicast service based on the tracking area information. The determining is performed by using a plurality of area parameters, thereby improving accuracy of the determining.

The manner of receiving the multicast area configuration may be set based on actual needs. Optionally, in an embodiment, the multicast area configuration may be received based on a terminal configuration update procedure. In other words, the receiving a multicast area configuration sent by a network device includes:

receiving the multicast area configuration during a terminal configuration update procedure.

In this embodiment of the present invention, the terminal configuration update procedure may be initiated by a policy control function (PCF) entity, and the terminal is notified of the multicast area configuration during the configuration update procedure. Optionally, the multicast area configuration may include one or more pieces of area parameter information of multicast services. In an optional embodiment, the multicast area configuration includes at least one of the following:

added area parameter information of a first multicast service;

deleted area parameter information of a second multicast service; and modified area parameter information of a third multicast service.

Figure 3:
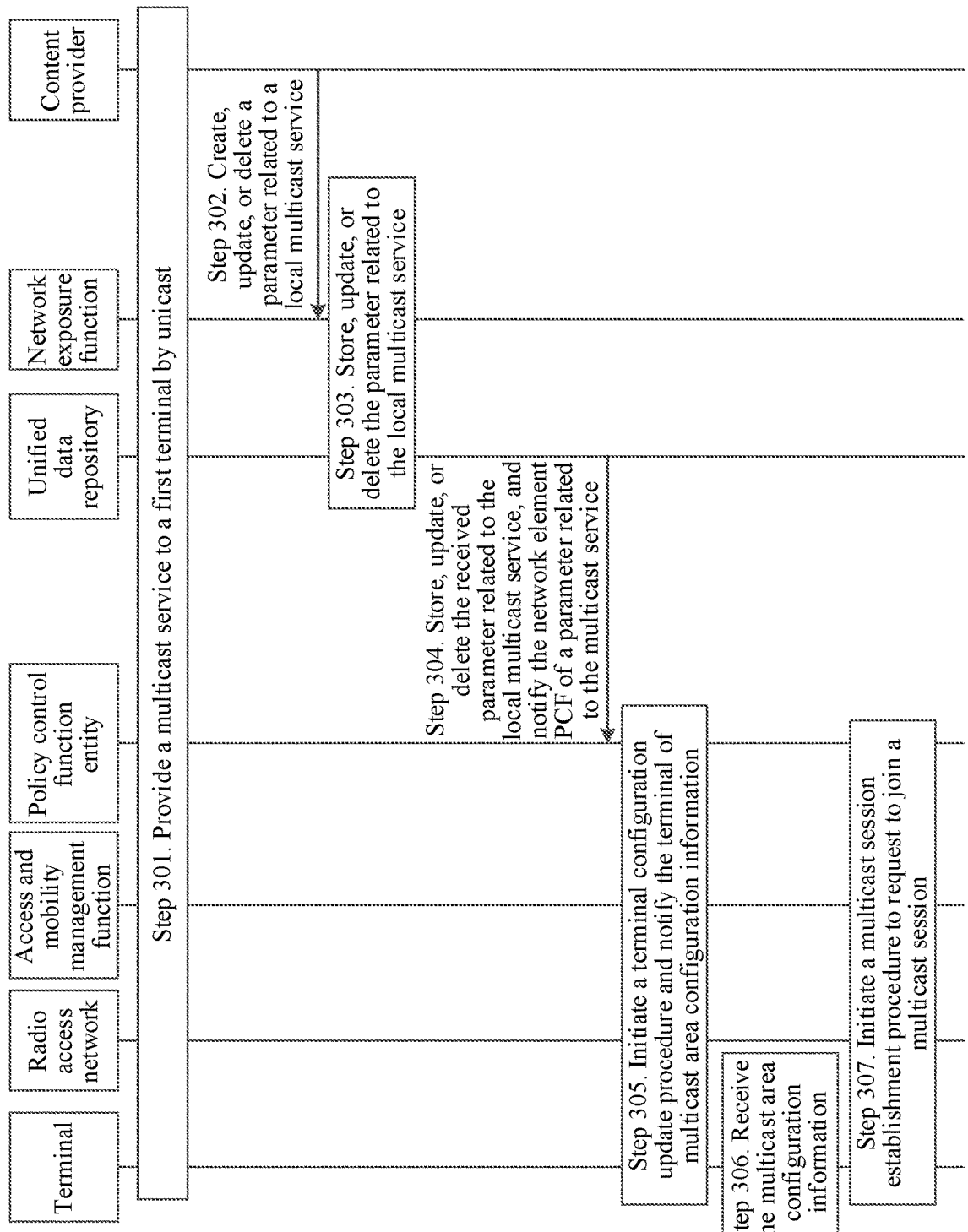
FIG. 3 is a flowchart of another multicast service processing method according to an embodiment of the present invention.

For better understanding of the present invention, the following describes an implementation process of the present invention in detail with reference to FIG. 3. As shown in FIG. 3, the following steps are included.

Step 301: A terminal registers a service application of a content provider (Content Provider, that is, a local multicast broadcast service (MBS) content provider), and obtains related information for receiving multicast service data from the content provider, such as application layer security information.

Step 302: The content provider creates, updates, or deletes a parameter related to a local multicast service, such as an IP multicast address parameter and area information of the multicast service (for example, geographic location information).

Step 303: A network element network exposure function (NEF) stores, updates, or deletes the parameter related to the local multicast service. For example, the network element NEF receives a newly added multicast service.

Step 304: A network element unified data repository (UDR) stores, updates, or deletes the received parameter related to the local multicast service, and notifies a network element PCF of a parameter related to the multicast service.

Step 305: The network element PCF initiates a terminal configuration update procedure and notifies the terminal of multicast area configuration information. The multicast area configuration information includes one or more pieces of area parameter information of a specific multicast service, where an area parameter of the multicast service may be an area parameter provided by a multicast service provider and/or an area parameter obtained through mapping by a core network element. For example, the network element PCF maps the area parameter of the multicast service. If area information of the multicast service received by the network element PCF is geographic location information, the network element PCF maps the area information to logical location information (for example, the network element PCF maps the area information to tracking area information indicated by using a tracking area code TAC).

Step 306: The terminal receives the multicast area configuration information. If the terminal is interested in a specific multicast service, the terminal detects whether the terminal is in a service area of the multicast service based on the multicast area configuration information.

Optionally, in an embodiment, if a multicast area parameter received by the terminal indicates that multicast service 1 is provided in an area in which a tracking area is TAC 1, the terminal detects a system message of a cell nearby the terminal. If a system message of a specific cell indicates that a tracking area to which the cell belongs is TAC 1, the terminal determines that the terminal is in a service area of multicast service 1. If a system message of a specific cell indicates that a tracking area to which the cell belongs is TAC 2, the terminal determines that the terminal is not in the service area of multicast service 1.

Optionally, in another embodiment, if a multicast area parameter indicates that multicast service 1 is sent at geographic location A, the terminal determines whether the terminal is in a service area of the multicast service based on positioning (for example, GPS).

Optionally, in still another embodiment, if a plurality of pieces of area parameter information are provided for a specific service in the multicast area configuration information, the terminal determines whether the terminal is in a service area of a specific multicast service based on the plurality of pieces of area parameter information. For example, if the network device provides geographic location information and tracking area information for a specific service, the terminal preliminarily determines whether the terminal is in a service area of a specific multicast service based on positioning. If the terminal preliminarily determines that the terminal is in the service area of the multicast service, the terminal further determines whether the terminal is in the service area of the multicast service based on the tracking area information.

Optionally, in a case that it is determined that the terminal is located in the service area of the multicast service, detection of a multicast service identifier is started. Whether multicast service data can be detected may be determined through the detection of the multicast service identifier. For example, the multicast service identifier may be a temporary mobile group identity (TMGI).

Optionally, if the terminal is not located in the service area of the multicast service, the detection of the multicast service identifier is stopped. For example, in an implementation, in a case that the terminal starts detection of a multicast service identifier, if the terminal moves from the service area of the multicast service to outside of the service area of the multicast service, the terminal stops the started detection of the multicast service identifier. Alternatively, in another implementation, in a case that it is determined, based on the area parameter information and the wireless area information, that the terminal is not located in the service area of the multicast service, the detection of the multicast service identifier is not started. The detection of the multicast service identifier is stopped or the detection of the multicast service identifier is not started, which can reduce power consumption of the terminal.

Step 307: The terminal initiates a multicast session establishment procedure to request to join a multicast session. Optionally, the terminal is in the service area of the multicast service. If the terminal detects no multicast service data or the UE has no necessary information (such as security information) for receiving the multicast service, the terminal initiates a multicast session establishment procedure to request to join a multicast session. For example, the UE is in the service area of the multicast service, and the network device indicates a multicast service receiving method (for example, a cell providing the multicast service indicates a time-frequency resource location of the multicast service data through a system message). If the UE detects no multicast data by using the multicast service receiving method provided by the network device, the UE initiates a multicast session establishment procedure. Alternatively, if the UE detects multicast data by using the multicast service receiving method provided by the network, but cannot parse the data (for example, the multicast data received by the UE has been treated securely, but the UE cannot successfully parse the data without relevant security parameters), the UE initiates a multicast session establishment procedure.

Figure 4:
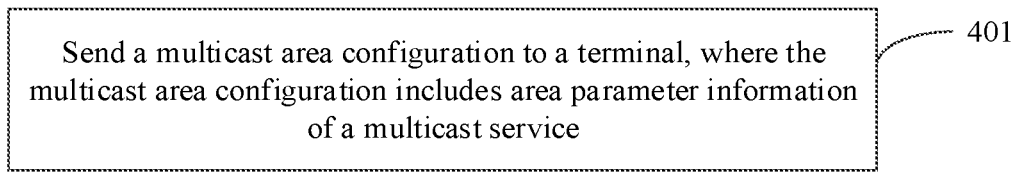
FIG. 4 is a flowchart of a multicast service configuration method according to an embodiment of the present invention.

Referring to FIG. 4, FIG. 4 is a flowchart of a multicast service configuration method according to an embodiment of the present invention. The method is applied to a network device. As shown in FIG. 4, the method includes the following steps.

Step 401: Send a multicast area configuration to a terminal, where the multicast area configuration includes area parameter information of a multicast service, and the area parameter information is used to trigger the terminal to obtain wireless area information and determine, based on the area parameter information and the wireless area information, whether the terminal is located in a service area of the multicast service.

Optionally, the area parameter information includes at least one of geographic location information, tracking area information, cell identification information, and frequency information.

Optionally, the geographic location information is used to indicate a geographic area corresponding to the service area of the multicast service; and/or the tracking area information is used to indicate a tracking area corresponding to the service area of the multicast service; and/or the cell identification information is used to indicate a cell corresponding to the service area of the multicast service; and/or the frequency information is used to indicate a frequency corresponding to the service area of the multicast service.

Optionally, the tracking area information is obtained through mapping by a first network entity based on the geographic location information.

Optionally, the sending a multicast area configuration to a terminal includes:

sending the multicast area configuration to the terminal during a terminal configuration update procedure.

Optionally, the multicast area configuration includes at least one of the following:

added area parameter information of a first multicast service;

deleted area parameter information of a second multicast service; and modified area parameter information of a third multicast service.

It should be noted that this embodiment serves as an implementation of the network device corresponding to the embodiment shown in FIG. 2. For specific implementations of this embodiment, reference may be made to the related descriptions of the embodiment shown in FIG. 2, and a same beneficial effect is achieved. To avoid repetition, details are not described herein again.

Figure 5:
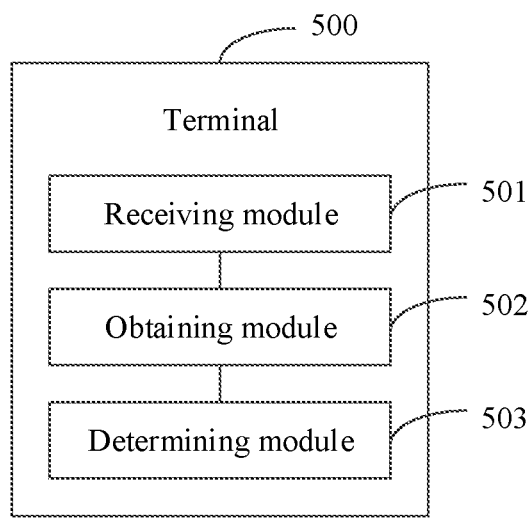
FIG. 5 is a structural diagram of a terminal according to an embodiment of the present invention.

Referring to FIG. 5, FIG. 5 is a structural diagram of a terminal according to an embodiment of the present invention. As shown in FIG. 5, the terminal 500 includes:

a receiving module 501, configured to receive a multicast area configuration sent by a network device, where the multicast area configuration includes area parameter information of a multicast service;

an obtaining module 502, configured to obtain wireless area information in a case that the multicast area configuration sent by the network device has been received; and a determining module 503, configured to determine that the terminal is located in a service area of the multicast service in a case that the area parameter information and the wireless area information satisfy a second condition.

Optionally, the terminal 500 further includes:
a processing module, configured to determine, based on the area parameter information and the wireless area information, whether the terminal is located in a service area of the multicast service.

Optionally, the terminal 500 further includes:
a detection start module, configured to start detection of a multicast service identifier in a case that it is determined that the terminal is located in the service area of the multicast service.

Optionally, the terminal 500 further includes:
a detection stop module, configured to stop the detection of the multicast service identifier if the terminal is not located in the service area of the multicast service.

Optionally, the terminal 500 further includes:
a processing module, configured to initiate a multicast session establishment procedure for the multicast service in a case that a first condition is satisfied; where the first condition includes:
it is determined that the terminal is located in the service area of the multicast service; and
no service data of the multicast service is detected or there is no key information for receiving the multicast service.

Optionally, the area parameter information includes at least one of geographic location information, tracking area information, cell identification information, and frequency information.

Optionally, in a case that a second condition is satisfied, it is determined that the terminal is located in the service area of the multicast service; where
the second condition includes at least one of the following:
the terminal is located in a geographic area corresponding to the geographic location information;
a tracking area corresponding to the wireless area information is included in a tracking area corresponding to the tracking area information;
a cell corresponding to the wireless area information is included in a cell corresponding to the cell identification information; and
a frequency corresponding to the wireless area information is included in a frequency corresponding to the frequency information.

Optionally, the receiving module 501 is specifically configured to receive the multicast area configuration during a terminal configuration update procedure.

Optionally, the multicast area configuration includes at least one of the following:
adding area parameter information of a first multicast service;
deleting area parameter information of a second multicast service; and
modifying area parameter information of a third multicast service.

The terminal provided in this embodiment of the present invention can implement the processes implemented by the terminal in the method embodiment in FIG. 2. To avoid repetition, details are not described herein again.

Figure 6:
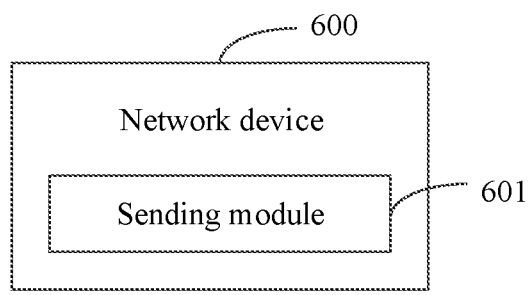
FIG. 6 is a structural diagram of a network device according to an embodiment of the present invention.

Referring to FIG. 6, FIG. 6 is a structural diagram of a network device according to an embodiment of the present invention. As shown in FIG. 6, the network device 600 includes:
a sending module 601, configured to send a multicast area configuration to a terminal, where the multicast area configuration includes area parameter information of a multicast service, and the area parameter information is used to trigger the terminal to obtain wireless area information and determine, based on the area parameter information and the wireless area information, whether the terminal is located in a service area of the multicast service.

Optionally, the area parameter information includes at least one of geographic location information, tracking area information, cell identification information, and frequency information.

Optionally, the geographic location information is used to indicate a geographic area corresponding to the service area of the multicast service; and/or
the tracking area information is used to indicate a tracking area corresponding to the service area of the multicast service; and/or
the cell identification information is used to indicate a cell corresponding to the service area of the multicast service; and/or
the frequency information is used to indicate a frequency corresponding to the service area of the multicast service.

Optionally, the tracking area information is obtained through mapping by a first network entity based on the geographic location information.

Optionally, the sending module 601 is specifically configured to send the multicast area configuration to the terminal during a terminal configuration update procedure.

Optionally, the multicast area configuration includes at least one of the following:
added area parameter information of a first multicast service;
deleted area parameter information of a second multicast service; and
modified area parameter information of a third multicast service.

The network device provided in this embodiment of the present invention can implement the processes implemented by the network device in the method embodiment in FIG. 4. To avoid repetition, details are not described herein again.

Figure 7:
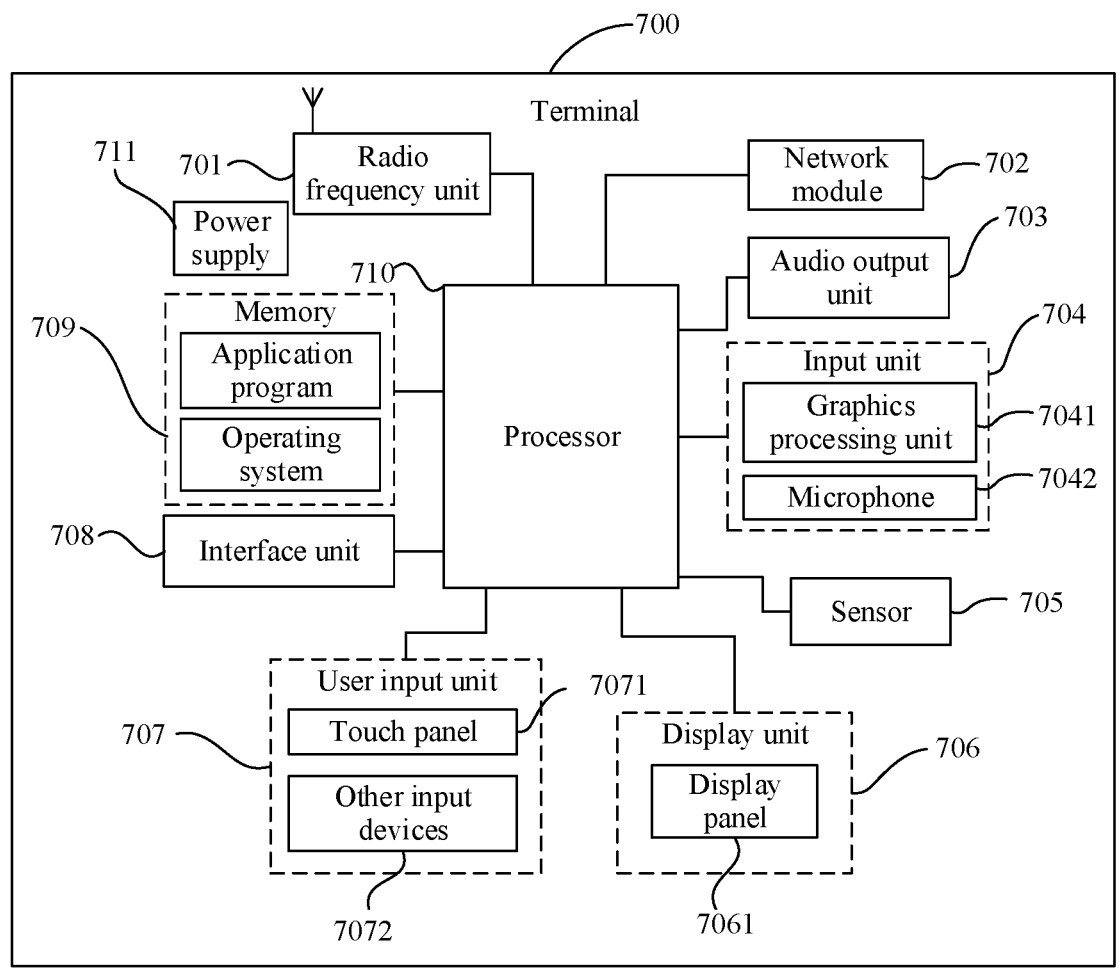
FIG. 7 is a structural diagram of another terminal according to an embodiment of the present invention.

FIG. 7 is a schematic diagram of a hardware structure of a terminal for implementing the embodiments of the present invention.

The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art can understand that the structure of the terminal shown in FIG. 7 does not constitute a limitation on the terminal. The terminal may include more or fewer components than those shown in the figure, or have some components combined, or have different arrangement of the components. In this embodiment of the present invention, the terminal includes but is not limited to a mobile phone, a tablet computer, a notebook computer, a palmtop computer, a vehicle-mounted terminal, a wearable device, a pedometer, or the like.

A radio frequency unit 701 is configured to receive a multicast area configuration sent by a network device, where the multicast area configuration includes area parameter information of a multicast service; and obtain wireless area information in a case that the multicast area configuration has been received.

A processor 710 is configured to determine, based on the area parameter information and the wireless area information, whether the terminal is located in a service area of the multicast service.

It should be noted that, in this embodiment, the processor 710 and the radio frequency unit 701 can implement the processes implemented by the terminal in the method embodiment in FIG. 2. To avoid repetition, details are not described herein again.

It should be understood that, in this embodiment of the present invention, the radio frequency unit 701 may be configured to receive and send signals during an information receiving and sending process or a call process. Specifically, the radio frequency unit 701 receives downlink data from a base station, sends the downlink data to the processor 710 for processing, and sends uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and other devices through a wireless communications system.

The terminal provides a user with wireless broadband Internet access by using the network module 702, for example, helping the user to send and receive e-mails, browse web pages, and access streaming media.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal received sound or a message received sound) related to a specific function performed by the terminal 700. The audio output unit 703 includes a speaker, a buzzer, a receiver, and the like.

The input unit 704 is configured to receive an audio or video signal. The input unit 704 may include a graphics processing unit (GPU) 7041 and a microphone 7042. The graphics processing unit 7041 processes image data of a static picture or a video obtained by an image capture apparatus (for example, a camera) in a video capture mode or an image capture mode. A processed image frame may be displayed on the display unit 706. An image frame processed by the graphics processing unit 7041 may be stored in the memory 709 (or another storage medium) or sent by using the radio frequency unit 701 or the network module 702. The microphone 7042 can receive a sound and process the sound into audio data. The processed audio data can be converted, in a telephone call mode, into a format that can be sent to a mobile communication base station through the radio frequency unit 701, for outputting.

The terminal 700 further includes at least one sensor 705, for example, an optical sensor, a motion sensor, and another sensor. Specifically, the optical sensor includes an ambient light sensor and a proximity sensor. The ambient light sensor may adjust luminance of a display panel 7061 based on brightness of ambient light, and the proximity sensor may turn off the display panel 7061 and/or backlight when the terminal 700 moves to an ear. As a type of motion sensor, an accelerometer sensor may detect magnitudes of accelerations in various directions (typically three axes), may detect a magnitude and direction of gravity when being stationary, and may be applied to terminal posture recognition (such as switching between a landscape orientation and a portrait orientation, related games, and magnetometer posture calibration), functions related to vibration recognition (such as pedometer and tapping), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided to the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information, and generate key signal input related to user setting and function control of the terminal. Specifically, the user input unit 707 includes a touch panel 7071 and other input devices 7072. The touch panel 7071 is also referred to as a touchscreen, and may collect a touch operation of the user on or near the touch panel 7071 (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 710, receives and executes a command sent by the processor 710. In addition, the touch panel 7071 may be implemented in a plurality of types, for example, as a resistive, capacitive, infrared, or a surface acoustic wave touch panel. In addition to the touch panel 7071, the user input unit 707 may further include the other input devices 7072. Specifically, the other input devices 7072 may include but are not limited to a physical keyboard, a function key (such as a volume control key or a power on/off key), a trackball, a mouse, and a joystick. Details are not described herein.

Further, the touch panel 7071 may cover the display panel 7061. After detecting a touch operation on or near the touch panel 7071, the touch panel 7071 transmits the touch operation to the processor 710 for determining a type of the touch event. Then the processor 710 provides corresponding visual output on the display panel 7061 based on the type of the touch event. In FIG. 7, the touch panel 7071 and the display panel 7061 serve as two separate components to implement input and output functions of the terminal. However, in some embodiments, the touch panel 7071 and the display panel 7061 may be integrated to implement the input and output functions of the terminal. This is not specifically limited herein.

The interface unit 708 is an interface for connecting an external apparatus to the terminal 700. For example, the external apparatus may include a wired or wireless headphone port, an external power (or battery charger) port, a wired or wireless data port, a memory card port, a port for connecting an apparatus with an identification module, an audio input/output (I/O) port, a video I/O port, an earphone port, and the like. The interface unit 708 may be configured to receive input (for example, data information or power) from the external apparatus and transmit the received input to one or more elements inside the terminal 700, or may be configured to transmit data between the terminal 700 and the external apparatus.

The memory 709 may be configured to store software programs and various data. The memory 709 may mainly include a program storage region and a data storage region. The program storage region may store an operating system, an application program required by at least one function (for example, an audio play function or an image play function), and the like. The data storage region may store data (for example, audio data and address book) created based on use of the mobile phone, and the like. In addition, the memory 709 may include a high-speed random access memory, and may further include a non-volatile memory, for example, at least one magnetic disk storage device, a flash memory device, or other volatile solid-state storage device.

The processor 710 is a control center of the terminal, is connected to various parts of the entire terminal by using various interfaces and lines, and performs various functions of the terminal and processes data processing by running or executing software programs and/or modules stored in the memory 709 and invoking data stored in the memory 709, to perform overall monitoring on the terminal. The processor 710 may include one or more processing units. Preferably, the processor 710 may integrate an application processor and a modem processor. The application processor mainly processes an operating system, a user interface, an application program, and the like. The modem processor mainly processes wireless communication. It can be understood that the modem processor may alternatively not be integrated in the processor 710.

The terminal 700 may further include a power supply 711 (for example, a battery) that supplies power to the components. Preferably, the power supply 711 may be logically connected to the processor 710 through a power management system, to implement functions such as charging management, discharging management, and power consumption management through the power management system.

In addition, the terminal 700 includes some functional modules that are not shown, which are not further described herein.

Preferably, an embodiment of the present invention further provides a terminal, including a processor 710, a memory 709, and a computer program stored in the memory 709 and capable of running on the processor 710. When the computer program is executed by the processor 710, the processes of the foregoing embodiments of the multicast service processing method are implemented, with the same technical effects achieved. To avoid repetition, details are not described herein again.

Figure 8:
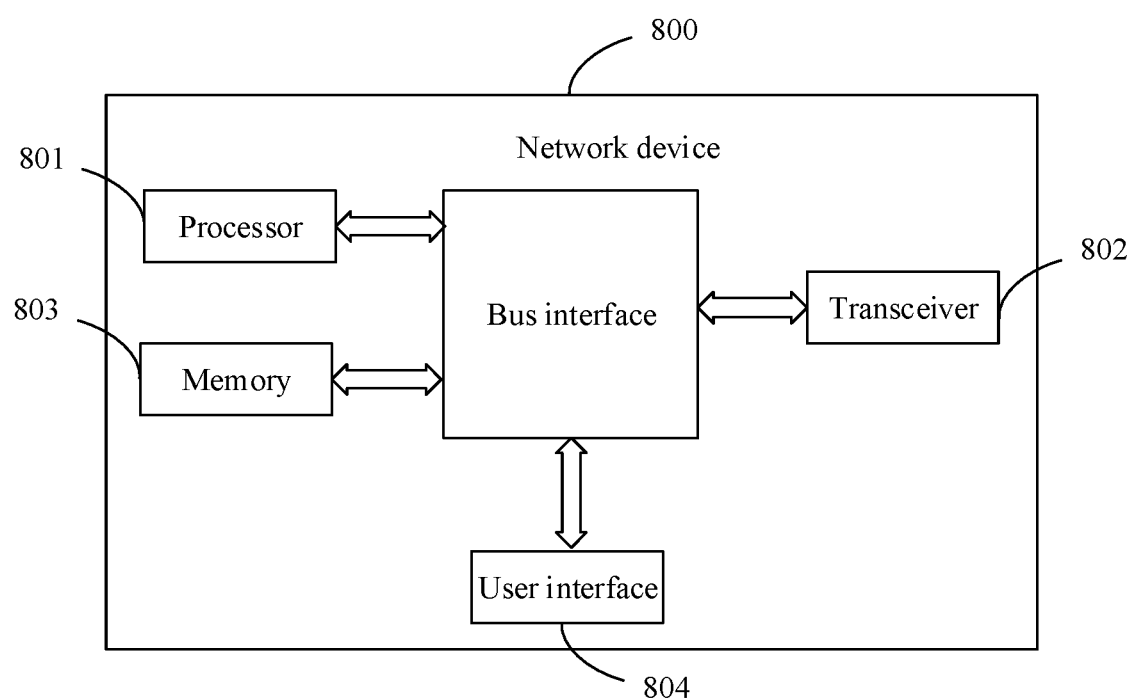
FIG. 8 is a structural diagram of another network device according to an embodiment of the present invention.

Referring to FIG. 8, FIG. 8 is a structural diagram of another network device according to an embodiment of the present invention. As shown in FIG. 8, the network device 800 includes a processor 801, a transceiver 802, a memory 803, and a bus interface.

A transceiver 802 is configured to send a multicast area configuration to a terminal, where the multicast area configuration includes area parameter information of a multicast service, and the area parameter information is used to trigger the terminal to obtain wireless area information and determine, based on the area parameter information and the wireless area information, whether the terminal is located in a service area of the multicast service.

It should be noted that, in this embodiment, the processor 801 and the transceiver 802 can implement the processes implemented by the network device in the method embodiment in FIG. 4. To avoid repetition, details are not described herein again.

In FIG. 8, a bus architecture may include any quantity of interconnected buses and bridges, and specifically connect together various circuits of one or more processors represented by the processor 801 and a memory represented by the memory 803. The bus architecture may further interconnect various other circuits such as a peripheral device, a voltage regulator, and a power management circuit. These are all common sense in the art, and therefore are not further described in this specification. The bus interface provides an interface. The transceiver 802 may be a plurality of components, including a transmitter and a receiver, and provides a unit for communicating with various other apparatuses on a transmission medium. For different user equipment, a user interface 804 may also be an interface that can be externally or internally connected to a required device, and the connected device includes but is not limited to a keypad, a display, a speaker, a microphone, a joystick, and the like.

The processor 801 is responsible for bus architecture management and general processing. The memory 803 may store data used by the processor 801 to perform an operation.

Preferably, an embodiment of the present invention further provides a network device, including a processor 801, a memory 803, and a computer program stored in the memory 803 and capable of running on the processor 801. When the computer program is executed by the processor 801, the processes of the foregoing embodiments of the multicast service configuration method are implemented, with the same technical effects achieved. To avoid repetition, details are not described herein again.

An embodiment of the present invention further provides a computer-readable storage medium. The computer-readable storage medium stores a computer program, and when the computer program is executed by a processor, the processes of the embodiments of the multicast service processing method on the terminal side provided in the embodiments of the present invention are implemented; or when the computer program is executed by a processor, the processes of the embodiments of the multicast service configuration method on the network device side provided in the embodiments of the present invention are implemented, with the same technical effects achieved. To avoid repetition, details are not described herein again. For example, the computer-readable storage medium is, for example, a read-only memory (ROM), a random access memory (RAM), a magnetic disk, or an optical disc.

It can be understood that the embodiments described in some embodiments of the present disclosure may be implemented by hardware, software, firmware, middleware, microcode, or a combination thereof. For hardware implementation, a module, a unit, a submodule, a subunit, and the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, other electronic units for performing the functions described in this application, or a combination thereof.

It should be noted that in this specification, the term "include", "comprise", or any of their variants are intended to cover a non-exclusive inclusion, so that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude the existence of other identical elements in the process, method, article, or apparatus that includes the element.

According to the foregoing description of the implementations, a person skilled in the art can clearly understand that the methods in the foregoing embodiments may be implemented by using software in combination with a necessary common hardware platform, and certainly may alternatively be implemented by using hardware. However, in most cases, the former is a more preferred implementation. Based on such an understanding, the technical solutions of the present invention essentially, or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the method described in the embodiments of the present invention.

The embodiments of the present invention are described above with reference to the accompanying drawings, but the present invention is not limited to these specific implementations. The foregoing embodiments are merely illustrative rather than restrictive. Inspired by the present invention, a person of ordinary skill in the art may develop many other manners without departing from the principle of the present invention and the protection scope of the claims. All such manners shall fall within the protection of the present invention.

What is claimed is:

1. A multicast service processing method, applied to a terminal and comprising:
   receiving a multicast area configuration sent by a network device, wherein the multicast area configuration comprises area parameter information of a multicast service;
   obtaining wireless area information in a case that the multicast area configuration has been received; and
   determining, based on the area parameter information and the wireless area information, whether the terminal is located in a service area of the multicast service;
   the method further comprising:
   in a case that a first condition is satisfied, initiating a multicast session establishment procedure for the multicast service; wherein
   the first condition comprises:
   it is determined that the terminal is located in the service area of the multicast service; and
   the terminal detects service data of the multicast service, but there is no key information for receiving the multicast service.

2. The method according to claim 1, further comprising:
   in a case that it is determined that the terminal is located in the service area of the multicast service, starting detection of a multicast service identifier.

3. The method according to claim 1, further comprising:
   if the terminal is not located in the service area of the multicast service, stopping detection of a multicast service identifier.

4. The method according to claim 1, wherein the area parameter information comprises at least one of geographic location information, tracking area information, cell identification information, and frequency information.

5. The method according to claim 4, wherein in a case that a second condition is satisfied, it is determined that the terminal is located in the service area of the multicast service; wherein
   the second condition comprises at least one of the following:
   the terminal is located in a geographic area corresponding to the geographic location information;
   a tracking area corresponding to the wireless area information is comprised in a tracking area corresponding to the tracking area information;
   a cell corresponding to the wireless area information is comprised in a cell corresponding to the cell identification information; and
   a frequency corresponding to the wireless area information is comprised in a frequency corresponding to the frequency information.

6. The method according to claim 1, wherein the receiving a multicast area configuration sent by a network device comprises:
   receiving the multicast area configuration during a terminal configuration update procedure.

7. The method according to claim 6, wherein the multicast area configuration comprises at least one of the following:
   adding area parameter information of a first multicast service;
   deleting area parameter information of a second multicast service; and
   modifying area parameter information of a third multicast service.

8. A multicast service configuration method, applied to a network device and comprising:
   sending a multicast area configuration to a terminal, wherein the multicast area configuration comprises area parameter information of a multicast service, and the area parameter information is used to trigger the terminal to obtain wireless area information and determine, based on the area parameter information and the wireless area information, whether the terminal is located in a service area of the multicast service;
   in a case that a first condition is satisfied, the terminal initiates a multicast session establishment procedure for the multicast service; wherein
   the first condition comprises:
   it is determined that the terminal is located in the service area of the multicast service; and
   the terminal detects service data of the multicast service, but there is no key information for receiving the multicast service.

9. The method according to claim 8, wherein the area parameter information comprises at least one of geographic location information, tracking area information, cell identification information, and frequency information.

10. The method according to claim 9, wherein the geographic location information is used to indicate a geographic area corresponding to the service area of the multicast service; and/or
    the tracking area information is used to indicate a tracking area corresponding to the service area of the multicast service; and/or
    the cell identification information is used to indicate a cell corresponding to the service area of the multicast service; and/or
    the frequency information is used to indicate a frequency corresponding to the service area of the multicast service.

11. The method according to claim 9, wherein the tracking area information is obtained through mapping by a first network entity based on the geographic location information.

12. The method according to claim 8, wherein the sending a multicast area configuration to a terminal comprises:
    sending the multicast area configuration to the terminal during a terminal configuration update procedure.

13. The method according to claim 12, wherein the multicast area configuration comprises at least one of the following:

added area parameter information of a first multicast service;

deleted area parameter information of a second multicast service; and modified area parameter information of a third multicast service.

14. A network device, comprising a memory, a processor, and a program stored in the memory and capable of running on the processor, wherein when the program is executed by the processor, the steps of the multicast service configuration method according to claim 8 are implemented.

15. A terminal, comprising a memory, a processor, and a program stored in the memory and capable of running on the processor, wherein when the program is executed by the processor, the following steps are implemented:

receiving a multicast area configuration sent by a network device, wherein the multicast area configuration comprises area parameter information of a multicast service;

obtaining wireless area information in a case that the multicast area configuration has been received; and determining, based on the area parameter information and the wireless area information, whether the terminal is located in a service area of the multicast service;

wherein when the program is executed by the processor, the following steps are further implemented:

in a case that a first condition is satisfied, initiating a multicast session establishment procedure for the multicast service; wherein the first condition comprises:

it is determined that the terminal is located in the service area of the multicast service; and the terminal detects service data of the multicast service, but there is no key information for receiving the multicast service.

16. The terminal according to claim 15, wherein when the program is executed by the processor, the following steps are further implemented:

in a case that it is determined that the terminal is located in the service area of the multicast service, starting detection of a multicast service identifier.

17. The terminal according to claim 15, wherein the area parameter information comprises at least one of geographic location information, tracking area information, cell identification information, and frequency information.

18. The terminal according to claim 15, wherein when the program is executed by the processor, the following steps are further implemented:

receiving the multicast area configuration during a terminal configuration update procedure.

\* \* \* \* \*